(12) United States Patent
Wright

(10) Patent No.: US 9,475,476 B1
(45) Date of Patent: Oct. 25, 2016

(54) CONTROL OF AN AIR DRYER DRAIN VALVE CYCLE

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 0 days.

(21) Appl. No.: 14/865,902

(22) Filed: Sep. 25, 2015

(51) Int. Cl.
*B01D 53/26* (2006.01)
*B60T 17/00* (2006.01)

(52) U.S. Cl.
CPC ............. *B60T 17/004* (2013.01); *B01D 53/26* (2013.01)

(58) Field of Classification Search
CPC .............................. B60T 17/004; B01D 53/26
See application file for complete search history.

(56) References Cited

U.S. PATENT DOCUMENTS

| | | | | |
|---|---|---|---|---|
| 5,901,464 A | * | 5/1999 | Kazakis | B01D 45/16 34/562 |
| 6,276,343 B1 | * | 8/2001 | Kawamura | F02M 25/0809 123/516 |
| 8,490,991 B2 | | 7/2013 | Folchert et al. | |
| 9,283,944 B2 | * | 3/2016 | Wright | B60T 17/004 |
| 2008/0160363 A1 | * | 7/2008 | Tsukada | H01M 8/04097 429/414 |
| 2009/0188306 A1 | * | 7/2009 | Thomas | G01N 7/16 73/64.45 |
| 2010/0216045 A1 | * | 8/2010 | Ishibashi | H01M 8/04231 429/446 |

FOREIGN PATENT DOCUMENTS

| | | |
|---|---|---|
| CN | 204208442 | 3/2015 |
| JP | 2009/154613 | 7/2009 |
| WO | 2008/130730 | 10/2008 |

OTHER PUBLICATIONS

International Search Report Form PCT/ISA/220, International Application No. PCT/US2015/052294, pp. 1-12, Dated May 27, 2016.

* cited by examiner

*Primary Examiner* — Christopher P Jones
(74) *Attorney, Agent, or Firm* — Bond Schoeneck and King PLLC; David Nocilly

(57) ABSTRACT

A system for variably controlling the purge cycle of a locomotive air supply system air dryer pre-filtration state. A sensor in the air inlet of the air dryer provides temperature information to a controller, which calculates an appropriate purge cycle time based on the saturation partial pressure of water vapor at the actual temperature of the air entering the air dryer and the operates the drain valve according to the particular purse cycle time.

13 Claims, 4 Drawing Sheets

CONTROL OF AN AIR DRYER DRAIN VALVE CYCLE

BACKGROUND OF THE INVENTION

1. Field of the Invention

The present invention relates to railway air system air dryers and, more particularly, to a system and method for controlling the cycling of an air dryer drain valve.

2. Description of the Related Art

Railway air systems generally comprise one or more air compressors that provide compressed air for use in connection with, among other things, the locomotive and railcar braking systems. For example, a typical Association of American Railroads (AAR) compliant locomotive air supply system has an air compressor, an air cooler, and two main reservoirs in series, referred to as MR1 and MR2. As the mechanical compression of ambient air will result in liquid and aerosolized water and oil in the compressed air stream, a railway air system will also include an air dryer for the removal of these contaminants. In an AAR system, the air dryer is usually installed between MR1 and MR2, so that the dried air is delivered to MR2. The air in MR2 is used as an exclusive air source for the train braking system and is protected by a back-flow check valve positioned in series between MR1 and MR2. The air in MR1 is used for other locomotive air consumers like the windshield wipers, horn, sanders, snow-blasters, etc. When the air is consumed from either MR1 or MR2, the air compressor will be operated to recharge the system. If the air pressure in MR1 is less than MR2, the air compressor is operated so that air flows into MR1 to recharge it. Air will not flow into MR2, however, until the pressure in MR1 is greater than the pressure in MR2. Railway air systems such as this may also include a pre-filtration stage comprised of a water separator and/or coalescer that removes both liquid and aerosolized water and oil from the air stream of the air system. Pre-filtration stage may be an independent air treatment unit or may be combined with the air dryer. In either approach, any water and oil will be accumulated in the pre-filtration stage as compressed air flows through it. As a result, a drain valve is normally associated with the pre-filtration state for the periodic purging of accumulated liquid. The conventional control scheme for purging accumulated liquid is to open and close the drain valve according to a fixed timer that is enabled in response to receipt of a compressor "ON" signal from the control system of the air compressor. Thus, whenever the air compressor is running, the drain valve is opened and closed according to the fixed time cycle set by the fixed timer to purge any accumulated liquid. The drain valve cycle consists of a drain valve purge duration and a purge interval between drain valve actuations.

For example, a typical drain valve will purge (open) for 2 seconds after every 2 minutes of the air compressor being operated. Although the conventional approach to purging accumulated liquids is simple and robust, it is inefficient and wastes considerable energy. For example, in the AAR compliant system described above, the drain valve purge cycle is enabled every time there is a compressor ON signal. As the air compressor is often operated when there no air flow between MR1 and MR2, there is no resulting flow through the pre-filtration stage. As a result, the drain valve is unnecessarily cycled according to its predetermined fixed timer despite the lack of air flow through the pre-filtration stage and thus lack of accumulated moisture. The fixed timing cycle is also inefficient because it assumes that the water content of the incoming "wet" compressed air is constant and is therefore based on the worst case scenario of maximum air flow and maximum wetness. In reality, however, the amount of water vapor in air is directly proportional to the saturation water vapor partial pressure, which has a highly non-linear, exponential-like, relation to air temperature. For example, the saturation water vapor partial pressure at 0° F. is 0.01857 psia; at 70° F. it is 0.3633 psia; at 125° F. it is 1.9447 psia, and at 150° F. it is 3.7228 psia. Air at 125° F. can contain 5.35 times as much water vapor as air at 70° F., and air at 150° F. can contain 10.2 times as much water vapor as air at 70° F. Air at 125° F. can contain 105 times as much water vapor as air at 0° F., and air at 150° F. can contain 200 times as much water vapor as air at 0° F. Thus, a fixed cycle drain valve having a purge cycle based on maximum wetness at a high air temperature, such as 150° F., will cycle up to 200 times more than is necessary when the air temperature is low, such as 0° F., and thus is very inefficient and wastes considerable energy.

BRIEF SUMMARY OF THE INVENTION

The present invention is a control system for a drain valve of a pre-filtration stage in a locomotive air supply system. The system includes a sensor in proximity to an inlet of an air dryer that is configured to output a signal corresponding to the actual temperature of an air stream in the inlet and a pre-filtration stage having a drain valve that is opened and closed according to a purge cycle time. A controller interconnected to the temperature sensor and the drain valve is programmed to calculate a variable purge cycle time based on the saturation partial pressure of water vapor at the actual temperature indicated by the signal received from the temperature sensor then operates the drain valve according to that calculated purge cycle time. The variable purge cycle generally consists of a fixed drain valve open duration and a variable time interval between drain valve actuations (i.e., openings). The purge cycle time is generally based on the saturation partial pressure of water vapor at the actual temperature by adjusting a predetermined cycle time according to the relationship between a reference saturation partial pressure and the saturation partial pressure of water vapor at the actual temperature. If the actual temperature is above a predetermined minimum temperature and below a predetermined maximum temperature, the predetermined cycle time is adjusted according to the relationship between a reference saturation partial pressure and the saturation partial pressure of water vapor at the actual temperature. If the actual temperature is below the predetermined minimum temperature, the predetermined cycle time is adjusted according to the relationship between a reference saturation partial pressure and the saturation partial pressure of water vapor at the predetermined minimum temperature. If the actual temperature is above the predetermined maximum temperature, the purge cycle time is set to be the same as the predetermined cycle time.

The present invention also comprises a method of controlling a drain valve of a pre-filtration stage in a locomotive air supply system according to a variable cycle time that is based on the air inlet air temperature of the air dryer. First, the temperature of an air steam in an inlet of an air dryer associated with the pre-filtration stage is sensed. Next, a purge cycle time is calculated based on the saturation partial pressure of water vapor at the actual temperature of the air stream in the inlet of the air dryer. Finally, the drain valve is controlled according to the calculated purge cycle time. If the actual temperature is above a predetermined minimum temperature and below a predetermined maximum temperature, the purge cycle time is based on the relationship between a reference saturation partial pressure and the saturation partial pressure of water vapor at the actual temperature. If the actual temperature is below the predetermined minimum temperature, the purge cycle time is based on the relationship between the reference saturation partial pressure and the saturation partial pressure of water vapor at the predetermined minimum temperature. If the actual temperature is above the predetermined minimum temperature, the purge cycle time is based on the predetermined cycle time.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
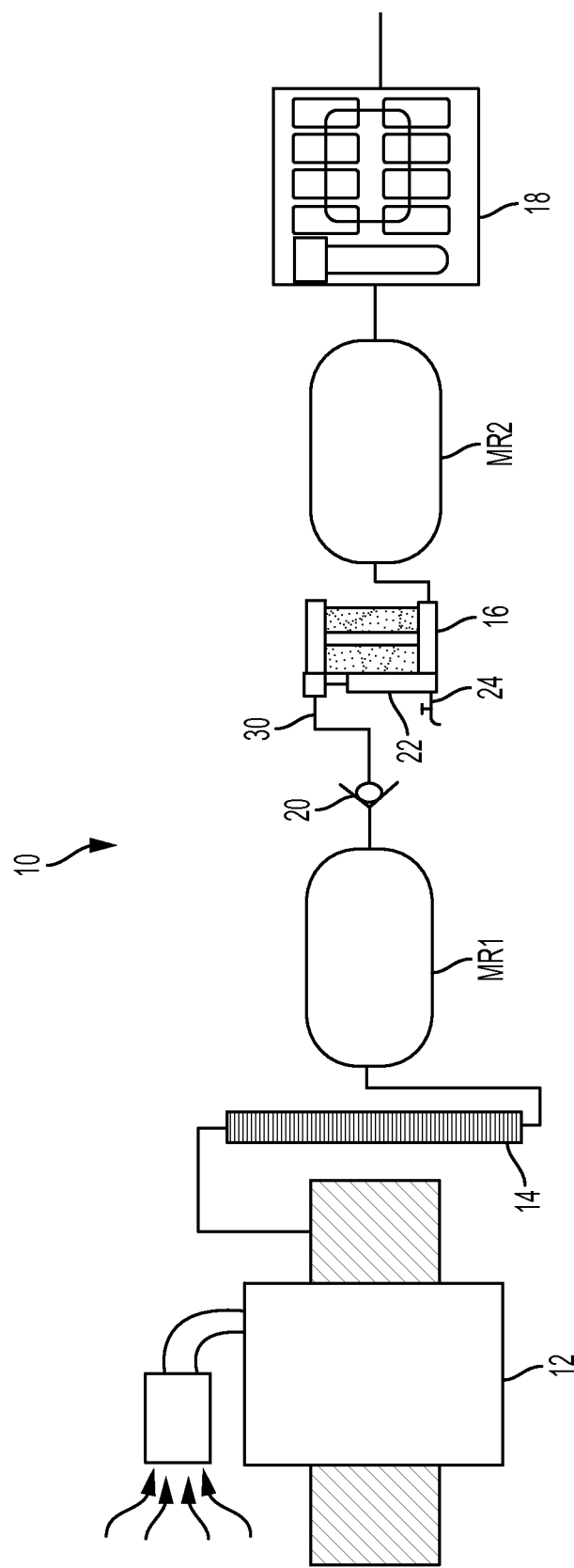
FIG. 1 is a schematic of a locomotive air supply system that includes an air dryer having a pre-filtration stage with a drain valve to be variably controlled by the present invention.

Referring now to the drawings, wherein like reference numerals refer to like parts throughout, there is seen in FIG. 1 a locomotive air system 10 having an air compressor 12, aftercooler 14, first and second main reservoirs MR1 and MR2, and an air dryer 16. Second main reservoir is coupled to the braking system 18 and a check valve 20 is positioned between the first and second main reservoirs MR1 and MR2. A pre-filtration stage 22 is associated with air dryer 16 and includes a drain valve 24 that is operated according to a variable drain valve purge cycle time that is dependent on actual conditions rather than a predetermined maximum amount of wet air.

Figure 2:
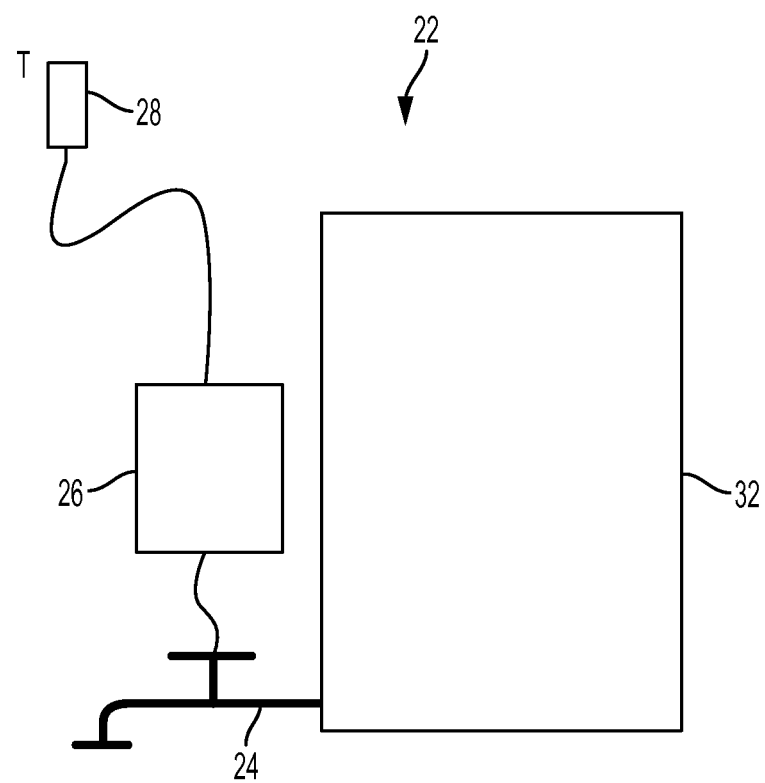
FIG. 2 is a schematic of a control system for pre-filtration stage and drain valve to be variably controlled according to the present invention.
Figure 3:
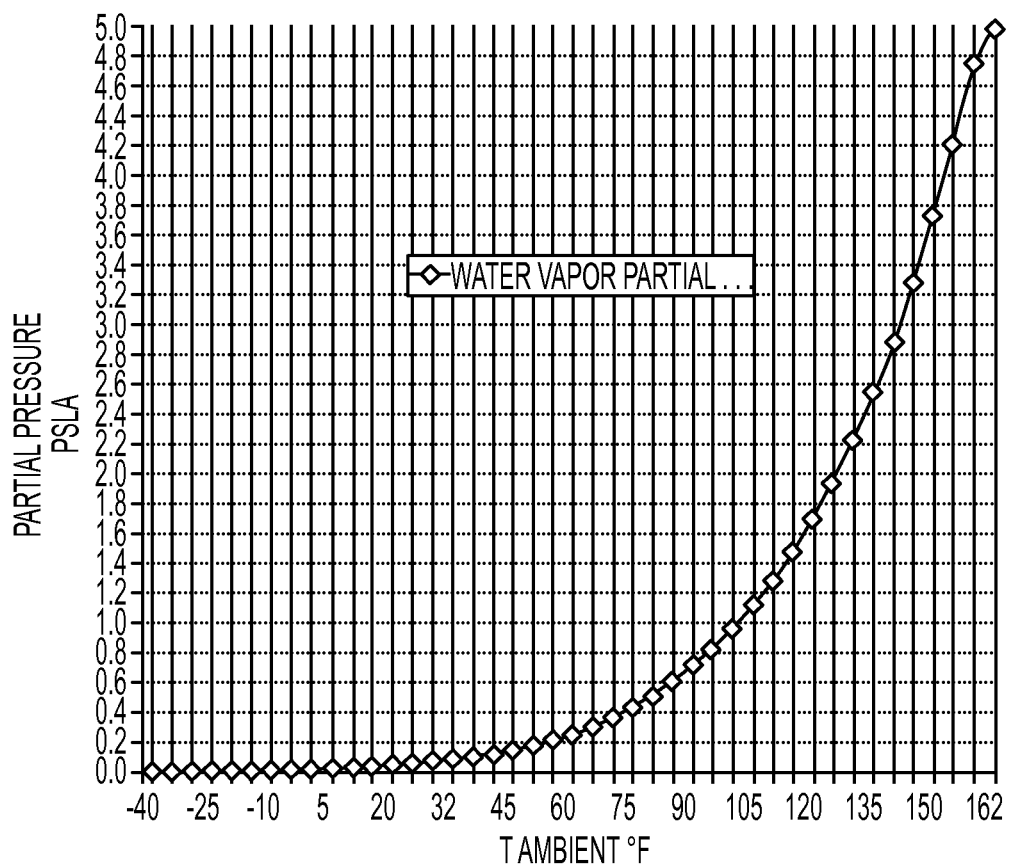
FIG. 3 is a graph water vapor partial pressure verses ambient temperature for use in controlling the drain valve of a pre-filtration stage according to the present invention.

Referring to FIGS. 1 and 2, pre-filtration stage 22 further comprises a controller 26 in communication with a temperature sensor 28, such as a thermistor or thermocouple, which is positioned in or in close proximity to the air stream inlet 30 of air dryer 16. Controller 26 is programmed to receive air temperature information from sensor 28 at inlet 30 to adjust the drain valve purge cycle time, referred to as Time(purge), so that the purge cycle time for drain valve 24 of the water separator and/or coalescer 32 of pre-filtration stage 22 is variably determined based on the air temperature. In most instances, the drain valve purge cycle time is adjusted proportionally to the saturation partial pressure of water vapor in air, as seen in FIG. 3, based on the actual inlet air temperature. It should be recognized that controller 26 and pre-filtration stage 22 may be included as part of air dryer 16, or provided separately as a stand along unit. Controller 26 may also be positioned remotely from pre-filtration stage 22 provided that controller 26 is able to communicate the appropriate change in purge cycle time to pre-filtration stage 22.

Figure 4:
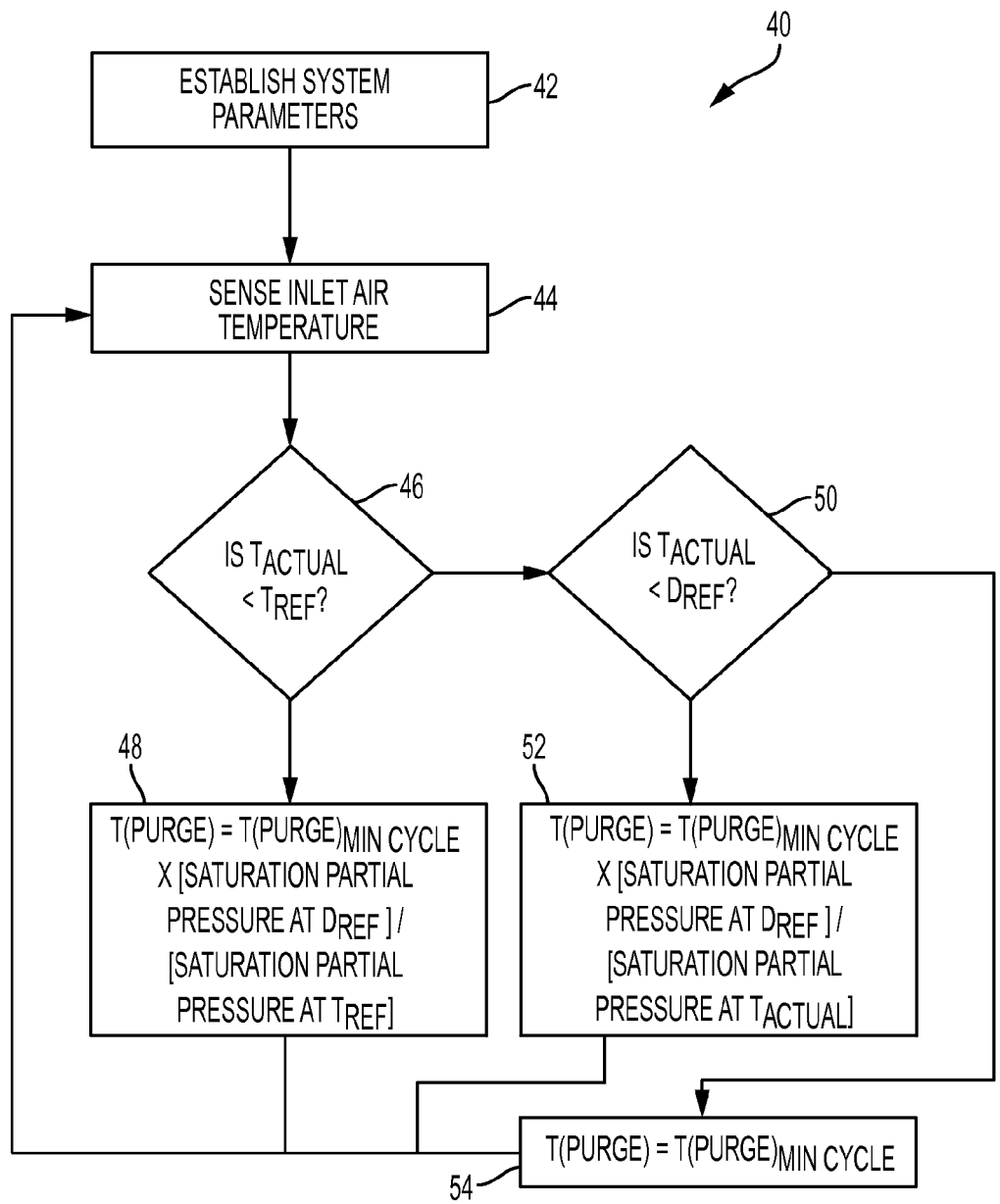
FIG. 4 is a flowchart of a process for controlling the drain valve of a pre-filtration stage according to the present invention.

Referring to FIG. 4, controller 26 is programmed to implement a purge control process 40 that adjusts the purge cycle time, Time(purge), based on actual conditions. First, the controller system operating parameters 42 of pre-filtration stage 22 are established that will be used to determine any change in the purge cycle timing. Operating parameters may include a predetermined minimum reference temperature, $T_{ref}$, a design reference inlet air temperature, $D_{ref}$, corresponding to a predetermined minimum purge cycle time, $Time(purge)_{min\ cycle}$. The predetermined minimum reference temperature, $T_{ref}$, represents the lowest temperature at which controller 26 will adjust the purge cycle time and results in a maximum time interval between drain valve actuations. The predetermined design reference inlet air temperature is selected based on the temperature that represents the maximum water load, which is a function of air temperature and air flow rate, that is less than the storage volume of pre-filtration stage 22 and less than the amount of water which can be discharged through an open drain valve 24 for a predetermined purge duration, for example 2 seconds, when system 10 is pressurized at the minimum system working pressure. The predetermined minimum purge cycle time represents the shortest time interval between subsequent actuations of drain valve 24. The minimum reference temperature, design reference inlet air temperature, and minimum purge cycle time, may be set as default values by the manufacturer or user based on the specifications of a particular pre-filtration stage 22, air dryer 16, and/or locomotive air system 10 and then loaded into the controller 26 during first step 42 of purge control process 40.

Once the operating parameters are loaded at step 42, the inlet air temperature is sensed 44, such as by sampling the output of temperature sensor 28 with controller 26 to determine the actual inlet air temperature, $T_{actual}$. A check 46 is then performed to determine if the actual inlet air temperature is less than the minimum reference temperature. If so, the purge cycle time is set according to the following formula 48:

$$Time(purge)=Time(purge)_{min\ cycle}\times[Saturation\ Partial\ Pressure\ at\ D_{ref}]/[Saturation\ Partial\ Pressure\ at\ T_{ref}]$$

Alternatively, the maximum purge interval may be set explicitly;

If $T_{actual} \leq T_{ref}$

Then $Time(purge)=Time(purge)_{max}$

If check 46 determines that the inlet air is greater than the minimum reference temperature, a second check 50 is performed to determine whether the inlet temperature is below the design reference temperature. If so, then the purge cycle time is set according to the following formula 52:

$$Time(purge)=Time(purge)_{min\ cycle}\times[Saturation\ Partial\ Pressure\ at\ D_{ref}]/[Saturation\ Partial\ Pressure\ at\ T_{actual}]$$

If second check 48 determines that the inlet air temperatures is equal to or greater than the design reference temperature, then the purge cycle time is set as follows 54:

$$Time(purge)=Time(purge)_{min\ cycle}$$

Thus, if $Time(purge)_{min\ cycle}$ is 2 minutes, the minimum reference temperature is −30° F. with a saturation partial pressure of 0.0062, and the design reference temperature is 100° F. with a saturation partial pressure of 0.9503, at temperatures less than or equal to −30° F., the time between purge cycles will be:

$$Time(purge)=(2\ min)\times(0.9503)/(0.0062)=306\ minutes$$

Under the same conditions with an inlet air temperature of 70 F, the time between purge cycles will be as follows:

Time(purge)=(2 min)×(0.9503)/(0.3633)=5.2 minutes

Under the same conditions with an inlet air temperature equal to or greater than 100° F., the time between purge cycles will be as follows:

Time(purge)=(2 min)

It should be recognized that Time(purge) could be set as the longest purge cycle time allowed by system 10, and then adjusted downwardly based on the air temperature using an inverse approach to that described above. Similarly, first check 46 and second check 48 may be implemented in a single or any number of computing steps so long as controller 26 applies the appropriate formula to adjust the purge cycle time based on the actual inlet air temperature provided by sensor 28 to account for the actual amount of moisture that may be present in the air.

Controller 26 may be programmed to receive an input representing when air compressor 12 is being operated to provide compressed air, e.g., an "ON" signal. Controller 26 may be programmed to open drain valve 24 upon detecting that air compressor 12 has been turned on, and then operate drain valve 24 as described above. Similarly, controller 26 can open drain valve 24 when signaled that air compressor 12 has been turned off to completely drain any accumulated water in pre-filtration stage 22 and thus prevent freezing in the event that system 10 is shut down for an extended period in cold temperatures.

In an alternative embodiment, the air dryer may use a humidity sensor in the outlet airstream to determine when the desiccant bed is approaching saturation by monitoring the instantaneous outlet humidity and temperature or other means of dew point dependent desiccant regeneration, such as that disclosed in application NY-1273. When the outlet humidity increases a pre-determined amount, the air dryer initiates a regeneration cycle. The air dryer may be designed so that the regeneration cycle time at some reference operating condition, for example 100° F. and 100% inlet RH and 100 SCFM flow, is known. For example at the reference operating conditions the desiccant bed would become saturated in 2 minutes. If using a humidity sensor in the outlet air stream for control of the regeneration cycle, then under these conditions the outlet air stream humidity would increase to the trigger level in approximately 2 minutes. Using a humidity sensor the regeneration cycle time is proportional to the actual conditions of inlet temperature, RH, and air flow, where the total water volume in at those conditions is proportional to the saturation partial pressure of water vapor in air as previously described. Because the air dryer on a locomotive is typically located between MR1 and MR2, the air from the compressor first flows into MR1, allowing a significant amount of the aerosol phase water to precipitate out in MR1, where it is expelled by the MR1 spitter valve. Because the desiccant bed becomes saturated with a fixed mass of water reasonably independent of the ambient temperature or rate of air flow, the total water mass flow through the prefiltration is approximately the same as the total water mass removed by the desiccant. As result, the total water collected in the prefiltration is roughly constant with the desiccant regeneration cycle. Therefore, in an air dryer having a prefiltration stage followed by a desiccant stage and having a closed-loop desiccant regeneration cycle using a humidity sensor in the air dryer outlet, the prefiltration drain valve may be vented in synchronization with the desiccant regeneration cycle.

What is claimed is:

1. A control system for a drain valve of a pre-filtration stage in a locomotive air supply system, comprising:
   a sensor for positioning in proximity to an inlet of an air dryer that is configured to output a signal corresponding to the actual temperature of an air stream in the inlet;
   a pre-filtration stage having a drain valve that is opened and closed according to a purge cycle time; and
   a controller interconnected to the temperature sensor and drain valve that is programmed to calculate the purge cycle time based on the saturation partial pressure of water vapor at the actual temperature indicated by the signal received from the temperature sensor and to operate the drain valve according to the calculated purge cycle time.

2. The system of claim 1, wherein the controller is programmed to calculate the purge cycle time based on the saturation partial pressure of water vapor at the actual temperature by adjusting a predetermined cycle time according to the relationship between a reference saturation partial pressure and the saturation partial pressure of water vapor at the actual temperature.

3. The system of claim 2, wherein the controller is programmed to adjust the predetermined cycle time according to the relationship between a reference saturation partial pressure and the saturation partial pressure of water vapor at the actual temperature if the actual temperature is above a predetermined minimum temperature and below a predetermined maximum temperature.

4. The system of claim 3, wherein the controller is programmed to adjust the predetermined cycle time according to the relationship between a reference saturation partial pressure and the saturation partial pressure of water vapor at the predetermined minimum temperature if the actual temperature is below the predetermined minimum temperature.

5. The system of claim 4, wherein the controller is programmed to set the purge cycle time at the predetermined minimum cycle time if the actual temperature is above the predetermined maximum temperature.

6. The system of claim 1, wherein the controller is programmed to open the drain valve if the controller detects that an air compressor of the locomotive air supply system has been turned on.

7. The system of claim 1, wherein the controller is programmed to open the drain valve if the controller detects that an air compressor of the locomotive air supply system has been turned off.

8. A method of controlling a drain valve of a pre-filtration stage in a locomotive air supply system, comprising the steps of:
   sensing the temperature of an air steam in an inlet of an air dryer associated with the pre-filtration stage;
   calculating a purge cycle time based on the saturation partial pressure of water vapor at the actual temperature of the air stream in the inlet of the air dryer;
   operating the drain valve according to the calculated purge cycle time.

9. The method of claim 8, wherein the step of calculating the purge cycle time based on the saturation partial pressure of water vapor at the actual temperature comprises adjusting a predetermined cycle time according to the relationship between a reference saturation partial pressure and the saturation partial pressure of water vapor at the actual temperature if the actual temperature is above a predetermined minimum temperature and below a predetermined maximum temperature.

10. The method of claim 9, wherein the step of calculating the purge cycle time based on the saturation partial pressure of water vapor at the actual temperature further comprises adjusting the predetermined cycle time according to the relationship between the reference saturation partial pressure and the saturation partial pressure of water vapor at the predetermined minimum temperature if the actual temperature is below the predetermined minimum temperature.

11. The method of claim 10, wherein the step of calculating the purge cycle time based on the saturation partial pressure of water vapor at the actual temperature further comprises setting the purge cycle time as the predetermined cycle time if the actual temperature is above the predetermined minimum temperature.

12. The method of claim 8, further comprising the steps of:
   sensing whether an air compressor of the locomotive air supply system has been turned on; and
   opening the drain valve if the air compressor has been turned on.

13. The method of claim 8, further comprising the steps of:
   sensing whether an air compressor of the locomotive air supply system has been turned off; and
   opening the drain valve if the air compressor has been turned off.

* * * * *